United States Patent
Kubo

[15] 3,657,658
[45] Apr. 18, 1972

[54] PROGRAM CONTROL APPARATUS
[72] Inventor: Moritada Kubo, Tokyo, Japan
[73] Assignee: Tokyo Shibaura Electric Co., Ltd., Kawasaki-shi, Japan
[22] Filed: Dec. 11, 1970
[21] Appl. No.: 97,285

[30] Foreign Application Priority Data

Dec. 13, 1969 Japan..................................44/99842
Dec. 13, 1969 Japan..................................44/99843
Dec. 13, 1969 Japan..................................44/99844
Dec. 13, 1969 Japan..................................44/99845

[52] U.S. Cl.................................328/61, 307/225, 307/271, 328/37, 328/38, 328/39, 328/48, 328/104, 328/140
[51] Int. Cl..........................................................H03k 1/00
[58] Field of Search...................328/37, 38, 39, 40, 41, 42, 328/48, 61, 104, 129, 136, 140, 154; 307/225, 233, 271

[56] References Cited

UNITED STATES PATENTS 2,927,161 3/1960 Harris..............................328/104 X
2,941,152 6/1960 Gosslau................................328/48
2,994,790 8/1961 Delaney...........................328/42 X
3,172,042 3/1965 Dawirs............................328/136 X
3,263,174 7/1966 Bjorkman et al..................307/271 X
3,264,566 8/1966 Kaufman et al...................307/271 X
3,500,215 3/1970 Leuthold et al........................328/61

Primary Examiner—Stanley T. Krawczewicz
Attorney—Flynn & Frishauf

[57] ABSTRACT

Program control apparatus for generating programmed control signals comprises a clock pulse oscillator, a frequency divider or multiplier for converting the clock pulse into a plurality of frequency signals of different frequencies, a logical operation circuit for selecting the frequency signals in accordance with a command signal, a counter for counting a preset number of the outputs from the logical operation circuit for successively providing the programmed control signal, and means responsive to each control signal for resetting the counter.

10 Claims, 8 Drawing Figures

PROGRAM CONTROL APPARATUS

This invention relates to program control apparatus and more particularly to a program control apparatus wherein a plurality of frequency signals are selected according to a command for causing a single counter of a given capacity to sequentially generate control signals at a desired time according to a prescribed program and is especially useful to be mounted on a satellite and the like space vehicles.

Certain program control apparatus designed to generate control signals at a definite time interval according to a prescribed program and applied these control signals to another control device, for example, a program control apparatus mounted on a satellite often receives a command signal from a ground station such that "cut off a rocket of a predetermined stage after a predetermined number of seconds." Conventional program control apparatus to be mounted on a satellite generally comprises an oscillator for generating clock pulses of a definite frequency, and a plurality of counters of different number of counts respectively counting clock pulses from the oscillator respectively through switching devices. Responsive to a command signal sent from a ground station a particular switching device is operated to cause a given counter to count up a predetermined number of clock pulses for producing a control signal which is supplied to another control device.

As above described, since in the conventional program control apparatus, respective counters have different capacities where the command signal received involves a number of different contents it is necessary to mount a plurality of counters for such different contents on a satellite thus increasing the dimension and weight of the program control apparatus which is of course not desirable for space vehicles.

It is therefore an object of this invention to provide improved program control apparatus according to which various functions provided by a plurality of counters can be afforded by a single counter.

A more specific object of this invention is to provide a program control apparatus which is compact and light weight and yet can provide programmed control signals.

SUMMARY OF THE INVENTION

According to this invention there is provided program control apparatus comprising an oscillator for generating a clock pulse, means for converting the clock pulse into a plurality of frequency signals of different frequencies, program selector means for selecting the frequency signals in accordance with a predetermined programmed order, a shift register for shifting the output from the program selector means, a logical operation circuit for effecting a logical operation of the output from the shift register and the output from the program selector means for sequentially producing output pulses in accordance with the shift pulse from the shift register, a counter for counting a preset number of the output pulses from the logical operation circuit for producing a control output and means responsive to the control output from the counter for resetting the same whereby to produce programmed control outputs.

This invention can be more fully understood from the following detailed description when taken in connection with the accompanying drawings, in which.

Figure 1:
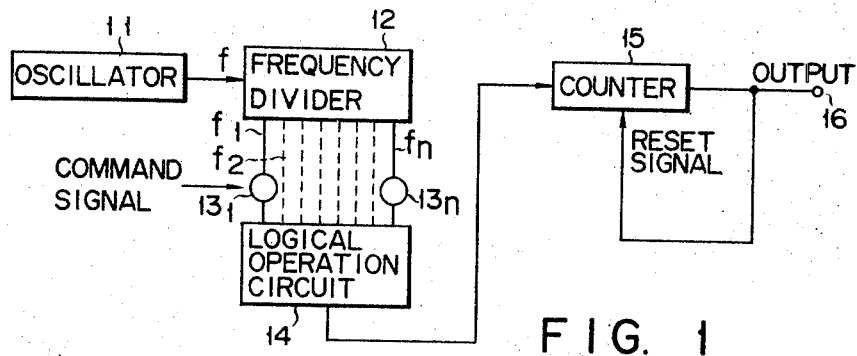
FIG. 1 is a block diagram of one embodiment of this invention.

A preferred embodiment of this invention diagrammatically shown in FIG. 1 comprises an oscillator 11 which produces clock pulse signals of a definite frequency, a frequency divider 12 for producing a plurality of frequency signals, a logical operation circuit 14 and a plurality of switches $13_1$, $13_2$ ... $13_n$, for example relays, for applying frequency divided signals to respective input terminals of the logical operation circuit, which may comprise a plurality of OR gate circuits. The outputs from the logical operation circuit 14 are sent to a counter 15 according to a programmed order. When the counter 15 counts up a predetermined number of counts a control signal is supplied to a control device, not shown, via an output terminal 16. As shown, this output is fedback to counter 15 to reset it to prepare for the next counting cycle.

Figure 2:
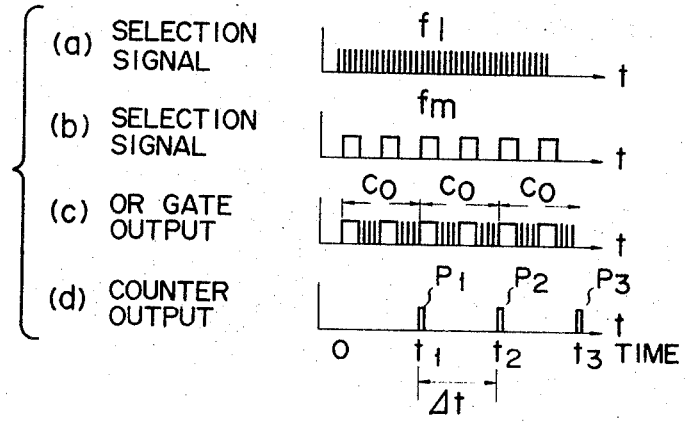
FIG. 2 shows waveforms of pulses to explain the operation of the embodiment shown in FIG. 1.

The operation of the embodiment shown in FIG. 1 will now be described with reference to FIG. 2. The frequency divider 12 operates to convert a clock pulse of a definite frequency $f$ into pulse signals of different frequencies of $k_1f$, $k_2f$ ..., $k_nf$, where $k_1, k_2 ... k_n$ represent constants. A command signal (indicated by an arrow in FIG. 1) operates suitable switches to supply an appropriate combination of these frequency signals to the logical operation circuit. Assuming the outputs from frequency divider 12 to be rectangular waves, by the logical sum of the OR gate circuits of the logical operation circuit an output is produced having a resultant waveform given by $C_0 = k_l f + ak_m f + a^2 k_n f$, where $k_l$ and $k_m$ are constants and have a relation $k_l < k_m < k_n$. Denoting the recurrence period of the rectangular waveform by T and the pulse width by W $a$ is given by $a = T - W/T$ and corresponds to the ratio of one period to the length of the zero line. In other words, the term $a$ shows that the density of the pulses can be varied by the suitable selection of waveforms of pulses by the command signal. By repeating the counting operation of a given number of pulses (for example $C_0$) and then resetting the counter 15, output pulses $P_1, P_2$ ... can be produced at a definite interval according to a prescribed program commanded by the command signal. As shown in FIGS. $2a$ to $2d$, when switches $13_l$ and $13_n$ are operated to select only frequency signals $f_l$ and $f_m$ (shown by FIGS. $2a$ and $2b$) among various outputs from the frequency divider 12 according to the programmed command signal, so as to add these selected signals by the logical operation circuit 14, as shown by FIG. $2c$, the sum is supplied to counter 15. Then each time the counter counts up the preset number of pulses $C_0$, output pulses $p_1, P_2$ and $P_3$ are produced at equal spacings.

Since the number of pulses $C_0$ to be counted is preset for each counter, the spacing between output pulses $\Delta t$ is given by an equation $$C_o = \Delta t (k_l f_e + a k_m f + a^2 k_n f + ...)$$

The type of frequency signals selected is determined by the command signal and moreover since constants $a$ and $f$ are predetermined by a particular design it is easy to determine the pulse spacing $\Delta t$ required for producing output pulses of equal spacings.

In this manner, the above described embodiment can miniaturize the program control apparatus with improved reliability since programmed control output signals of a predetermined spacing can be readily produced with a single counter.

Figure 3:
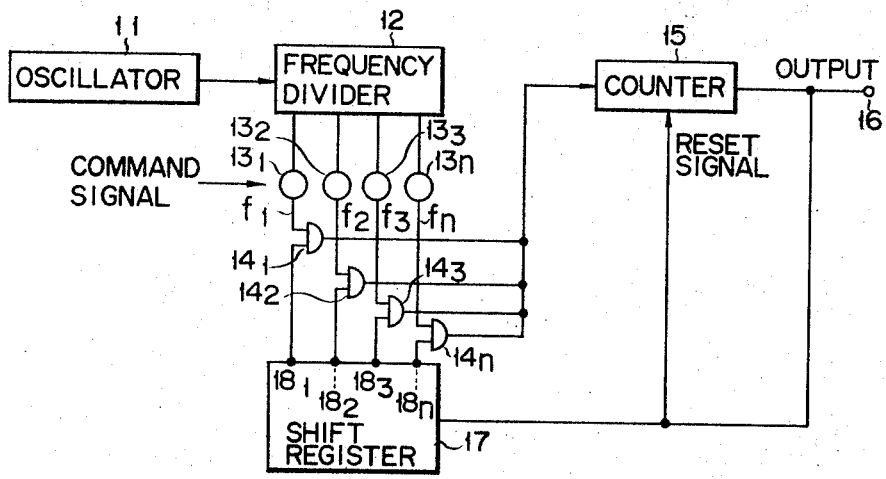
FIG. 3 is a block diagram of a modified embodiment of this invention.

A modified embodiment shown in FIG. 3 comprises an oscillator 11, a frequency divider 12, switches $13_1, 13_2 ... 13_n$, which are identical to those shown in FIG. 1, and a logical operation circuit comprised by a plurality of AND gate circuits $14_1, 14_2 ... 14_n$, respectively connected to the outputs of the frequency divider through respective switches, the opposite input terminals of these AND gate circuits being connected to output terminals of a shift register 17. The output terminals of the AND gate circuits are commonly connected to an input of a counter 15 of a predetermined capacity. Thus, each time the counter counts up a preset number of pulses, for example C, a control output signal is provided to output terminal 16. Again the output is fed back to the counter to reset the same. Further, the output at terminal 16 is supplied to the input of the shift register 17 to sequentially shift the outputs from the logical operation circuit according to a prescribed program.

Figure 4:
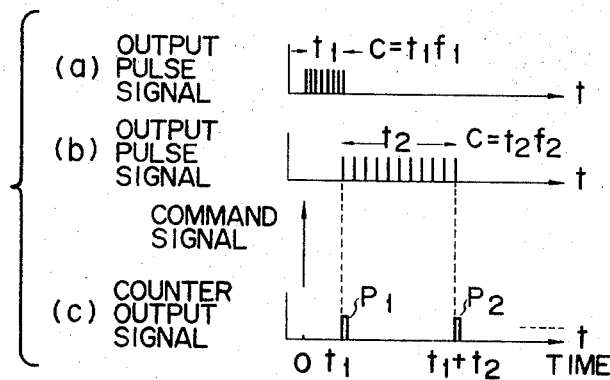
FIG. 4 shows waveforms of pulses to explain the operation of the embodiment shown in FIG. 3.

The operation of the embodiment shown in FIG. 3 will become apparent from the following description when taken in conjunction with FIG. 4. More particularly all switches $13_1$, $13_2 \ldots 13_n$ are closed by a programmed command signal. The frequency divider 12 operates to convert each clock pulse of definite frequency f supplied by oscillator 11 into pulse signals of various frequencies $k_1f, k_2f \ldots k_nf$, which are applied to corresponding switches $13_1, 13_2 \ldots 13_n$, as above described. Assuming now that the first output from shift register 17 is supplied from its terminal $18_1$, as both input terminals of AND gate circuit $14_1$ are supplied with input signals, this AND gate circuit is enabled to supply to counter 15 an output pulse signal (FIG. 4a) of a frequency equal to that of the signal supplied through switch $13_1$. Then the counter counts pulses of a number $C = t_1f_1$ until a time $t_1$ is reached starting from the operation commencing point O. When the counter counts up this number, it will supply an output signal $P_1$ (see FIG. 4c) to output terminal 16 which is also used to reset counter 15 and shift the output of shift register 17 to its output terminal $18_2$. Then AND gate circuit $14_1$ is disabled and AND gate circuit $14_2$ is enabled to supply an output pulse signal (FIG. 4b) having the same frequency as the signal through switch $13_2$ to counter 15 which counts a number of pulses $C = t_2f_2$ until time $t_2$ which is later than $t_1$. When counter 15 counts up this preset number of pulses, an output signal $P_2$ (FIG. 4c) is applied to output terminal 16 which is also used to reset counter 15 and shift the output of shift register 17 to terminal $18_3$. By repeating the above described cycles for sequentially shifting output terminals of shift register 17, programmed output pulse signals $P_1, P_2 \ldots P_n$ can be produced at a definite interval, which may be varied in any desired manner by varying the frequency of the output pulses of the frequency divider 12.

Figure 5:
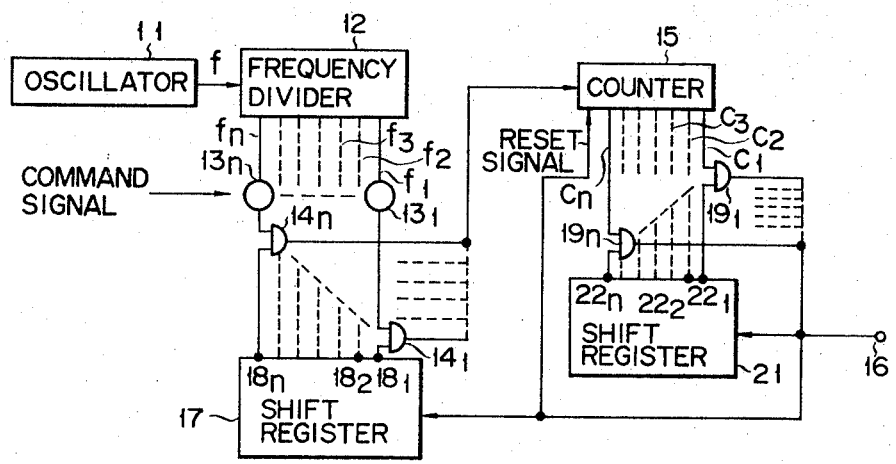
FIG. 5 shows a block diagram of another embodiment of this invention.

Another embodiment shown in FIG. 5 is generally identical to that shown in FIG. 3 except that output control signals from the counter are supplied to corresponding AND gate circuits $19_1, 19_2 \ldots 19_n$ comprising a second logical operation circuit and that the order of outputs from these AND gate circuits are shifted by a second shift register 21, so that corresponding elements of these two embodiments are designated by the same reference numerals.

Figure 6:
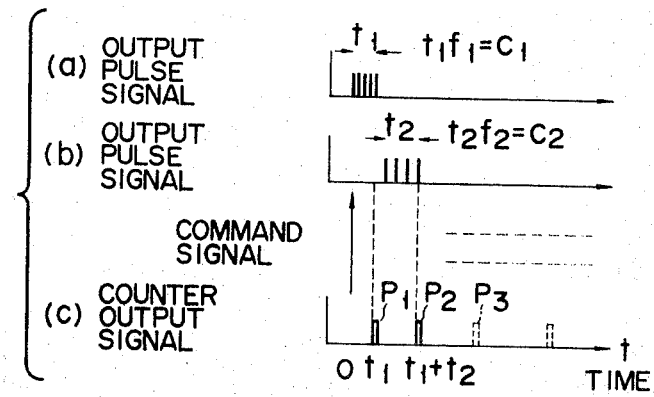
FIG. 6 shows waveforms of pulses to explain the operation of the embodiment shown in FIG. 5.

Thus, when the first shift register 17 provides its output on terminal $18_1$, AND gate circuit $14_1$ is enabled to supply an output pulse signal (FIG. 6a) having the same frequency as the signal through switch $13_1$ to counter 15. When the second shift register 21 provides its output on the first terminal $22_1$, the counter 15 counts a number of pulses $C = t_1f_1$ sent from AND gate circuit $14_1$ for an interval $t_2$. When the counter counts up this preset number, it supplies a pulse signal to one input terminal of AND gate circuit $19_1$. Then this AND gate circuit is enabled by the inputs impressed upon its both input terminals to provide an output pulse $P_1$ (FIG. 6c) for output terminal 16. As before, this output pulse $P_1$ is also utilized to shift the output of the first shift register 17 from terminal $18_1$ to terminal $18_2$, to shift the output of the second shift register 21 from terminal $22_1$ to terminal $22_2$ and to reset counter 15. Then AND gate circuit $14_2$ is enabled to supply to counter 15 a pulse signal (FIG. 6b) which is supplied through switch $13_2$ and has a frequency different from that of the pulse signal supplied through switch $13_1$. Since, the second shift register 21 now provides its output on terminal $22_2$, the counter 15 counts the second preset number of pulses $C = t_2f_2$ for an interval $t_2$. When counter 15 counts up this second preset number, it provides a pulse signal to one input of AND gate circuit $19_2$. Since both inputs are energized, AND gate circuit $19_2$ is enabled to supply an output signal $P_2$ (FIG. 6c) to output terminal 16. This output signal $P_2$ shifts the output of the first shift register 17 from terminal $18_2$ to terminal $18_3$ and shifts the output of the second shift register 21 from terminal $22_2$ to terminal $22_3$. Further, this output signal $P_2$ resets counter 15. These operations are sequentially repeated until finally the last preset number $C_n = t_nf_n$ is counted to produce an output signal $P_n$.

In this manner, programmed output signals of desired periods, that is output signals $P_1, P_2 \ldots P_n$ are produced at intervals $t_1, t_2 \ldots t_n$ which satisfy the relations $C = t_1f_1, C = t_2f_2 \ldots C_n = t_nf_n$ by setting counter 15 to various preset counts $C_1, C_2 \ldots C_n$. In other words, intervals $t_1, t_2 \ldots t_n$ may be varied to any desired values by suitable selection of the preset count $C_j$ and frequency $f_j$.

Figure 7:
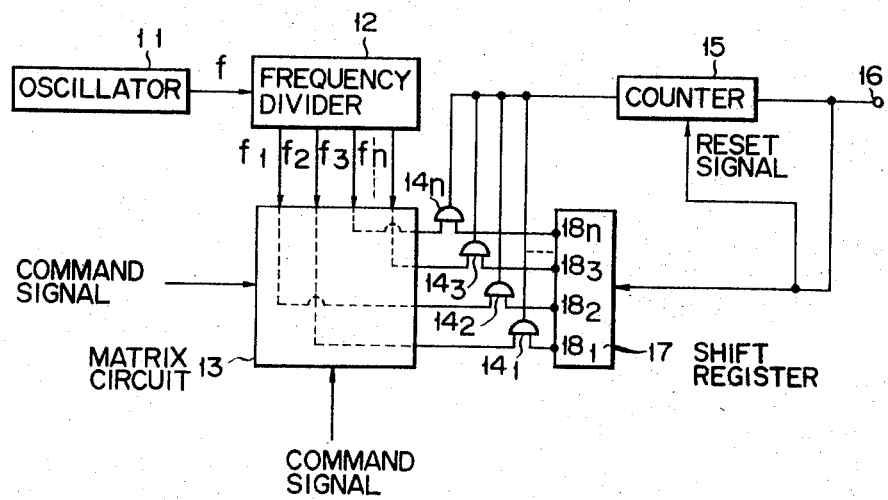
FIG. 7 shows a block diagram of still further modification of this invention.

Although in the embodiment shown in FIG. 3, the outputs of frequency divider 12 are selected by a programmed command signal applied to switches $13_1, 13_2 \ldots 13_n$, in another embodiment shown in FIG. 7, the outputs of the frequency divider 12 are applied to terminals of corresponding rows or columns of a matrix circuit 13 whereas programmed command signals are applied to the columns or rows of the matrix circuit so as to determine the order of deriving out of the outputs from the frequency divider 12. The outputs from the matrix circuit are supplied to counter 15 through a logical operation circuit 14 comprising a plurality of AND gate circuits $14_1, 14_2 \ldots 14_n$ so as to produce output control signals.

In operation, two types of the command signals are applied to matrix circuit 13 to selectively determine the order of deriving out of frequency signals $f_1, f_2 \ldots f_n$ from the frequency divider 12. Such order can be selected arbitrarily. For example, the signal of frequency $f_2$ may be supplied to AND gate circuit $14_2$, and signals of frequencies $f_1, f_3 \ldots 14_n$, respectively, for the purpose of selecting an order of $f_1f_3 \ldots f_n$n. As above described, since frequency signals $f_1, f_3 \ldots f_n$ formed by frequency divider 12 are impressed upon respective input terminals of matrix circuit 13 when the output of the shift register 17 firstly appears on its terminal $18_1$, both input terminals of AND gate circuit $14_1$ will be energized thus enabling the same. Thus, a signal having frequency $f_2$ is supplied to counter 15 which counts a preset number of pulses $C = t_1f_1$ an interval $t_1$. When the counter 15 counts up this preset number, it provides an output signal $P_1$ to output terminal 16. Again, this output signal is utilized to reset a counter 15 and to shift the output of shift register 17 to terminal $18_2$. Then AND gate circuit $14_1$ is disabled whereas AND gate circuit $14_2$ is enabled to supply the signal of frequency $f_1$ to counter 15, which when counts up another preset number of pulses $C = t_2f_2$ for an interval $t_2$ provides an output signal $P_2$ for output terminal 16. Thus counter 15 is reset and shift register 17 is shifted to its output terminal $18_3$. Thereafter the same operation is repeated for signals of frequencies $f_3 \ldots f_n$. In this manner, programmed output pulses $P_1, P_2 \ldots P_n$ are produced with predetermined intervals.

Figure 8:
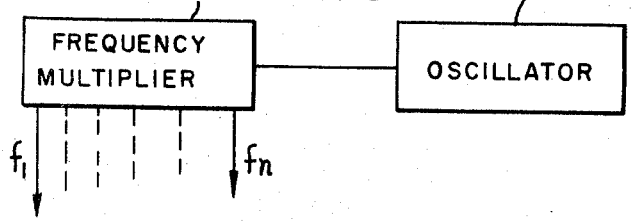
FIG. 8 shows, in part, a modified embodiment of the invention.

Although in each of the embodiments shown in FIGS. 1, 3, 5 and 7, a frequency divider 12 was used to derive a plurality of frequency signals from a clock pulse of an oscillator 11 it will be clear that a frequency multiplier can also be used. Such an arrangement is shown in FIG. 8, wherein an oscillator 11 is coupled to a multiplier 20 to provide output frequencies analogous to the outputs of the dividers of FIGS. 1, 3, 5 and 7.

Furthermore, it will be apparent that the invention is not limited to program control apparatus adapted to be mounted on space vehicles which are operated by command signals sent from a ground station and that the program control apparatus may be used in any applications where it is necessary to produce signals at a predetermined interval.

What is claimed is:

1. A program control apparatus comprising an oscillator for generating a clock pulse, means for converting said clock pulse into a plurality of frequency signals of different frequencies, program selector means for selecting said frequency signals in accordance with a predetermined programmed order, a shift register for shifting the output from said program selector means, a logical operation circuit for effecting a logical operation of the output from said shift register and the output from said program selector means for sequentially producing output pulses in accordance with the shift pulse from said shift register, a counter for counting a preset number of the output pulses from said logical operation circuit for producing a control output and means responsive to said control output from said counter for resetting the same, whereby to produce programmed control outputs.

2. A program control apparatus according to claim 1 wherein said means for producing said plurality of frequency signals comprises a frequency divider.

3. A program control apparatus according to claim 1 wherein said means for producing said plurality of frequency signals comprises a frequency multiplier.

4. A program control apparatus according to claim 1 wherein said program selector means comprises a plurality of switching means of a number corresponding to the number of said frequency signals, said switching means being operated by a command signal.

5. A program control apparatus according to claim 1 wherein said program selector means comprises a matrix circuit, input terminals of the rows or columns of said matrix circuit are connected to receive said plurality of frequency signals whereas the input terminals of the columns or rows of said matrix circuit are connected to receive two types of command signals to change the order of outputs from said matrix circuit.

6. A program control apparatus according to claim 1 wherein said logical operation circuit comprises a plurality of OR gate circuits for selecting either one of a plurality of output pulses for producing programmed outputs.

7. A program control apparatus according to claim 1 wherein said logical operation circuit comprises a plurality of AND gate circuits of the number corresponding to the number of preset counts of said counter, one input terminal of each AND gate circuit is connected to a corresponding one output terminal of said program selector circuit whereas the other input terminal is connected to a corresponding one output terminal of said shift register and wherein output terminals of said AND gate circuits are commonly connected to an output terminal of the control output signal.

8. A program control apparatus according to claim 1 which further includes means responsive to the output signal from said logical operation circuit for shifting said shift register.

9. A program control apparatus comprising an oscillator for generating a clock pulse, means for converting said clock pulse into a plurality of frequency signals of different frequencies, program selector means for selecting said frequency signals in accordance with a predetermined programmed order, a first shift register for shifting the output from said program selector means, a first logical operation circuit for effecting a logical operation of the output from said shift register and the output from said program selector means for sequentially producing output pulses in accordance with the shift pulse from said shift register, a counter for counting a preset number of the output pulses from said first logical operation circuit to produce an output, a second shift register for shifting the output from said counter, a second logical operation circuit for effecting a logical operation of the output from said second shift register and the output from said counter for sequentially producing output pulses in accordance with the shift pulse from said second shift register, and means responsive to the output pulse from said second logical operation circuit for resetting said counter.

10. A program control apparatus comprising an oscillator for generating a clock pulse, means for converting said clock pulse into a plurality of frequency signals of different frequencies, program selecting means for selecting said frequency signals in accordance with a predetermined programmed order, a logical operation circuit for successively sending out the outputs from said program selector means in accordance with a programmed order, a counter for counting up preset number of the outputs from said logical operation circuit so as to produce an output, and means responsive to each output of said counter for resetting the same.

* * * * *